United States Patent Office 3,171,734
Patented Mar. 2, 1965

3,171,734
BRAZING COMPOSITIONS HAVING POLYVINYL ALCOHOL AS A BINDER
Jerome A. Berson, Madison, Wis., and Arthur T. Cape, Monterey, Calif., assignors to Powder Melting Corporation, Monterey, Calif., a corporation of California
No Drawing. Filed Sept. 24, 1963, Ser. No. 311,200
4 Claims. (Cl. 75—.5)

This invention relates generally to brazing compositions, but has reference more particularly to brazing compositions containing metallic brazing powders including those of the nickel-base type, manganese-base type, copper-base type, cobalt-base type, and copper.

The use of various binders to facilitate application of such powders to the parts to be brazed has heretofore been proposed, but in all cases, have proved objectionable for various reasons, including the following:

(a) The binders were not soluble in water, so that if used, they had to be dissolved in various solvents other than water, including potentially dangerous organic solvents.

(b) The binders were not entirely satisfactory, from the viewpoint of holding the particles of brazing powder together until they commenced to sinter and melt.

(c) The binders did not become completely volatilized or consumed, or otherwise dissipated during the brazing operation, and left an ash or residue which materially hindered the uniform and free flow of the melted powder into the joints between the parts being brazed.

The present invention has as its primary object the provision of a brazing composition consisting of a metallic brazing powder and a binder which is completely soluble in water, holds the particles of brazing powder together until they commence to sinter and melt incidental to the brazing operation, and which becomes completely volatilized, consumed or dissipated during the brazing operation, and leaves no ash or residue which can hinder the uniform and free flow of the melted powder into the joints between the parts being brazed.

Another object of the invention is to provide a brazing composition of the character described, in the form of a flexible self-sustaining sheet, strip, film, ring, washer, wire, or similar form.

A further object of the invention is to provide a method of preparing a sheet of the aforesaid character.

A still further object of the invention is to provide a method of brazing in which a brazing composition of the aforesaid character is utilized.

Other objects and advantages of the invention will become apparent in the course of the following description of the invention.

In accordance with the invention, polyvinyl alcohol is used as a binder or vehicle for metallic brazing powders, particularly powders of the various types which have been described above, but it is to be understood that it may be used as a binder or vehicle for other types of brazing powders, with equally advantageous results.

Since polyvinyl alcohol is soluble in water, it can be made up in solutions and emulsions which can be mixed easily and uniformly with the powder and the mixture spread on a flat surface, and permitted to dry, or can be warmed to facilitate drying, and thereby formed into thin flexible sheets, in which the powder is uniformly distributed and locked or held, pending use of the sheet in a brazing operation.

In like manner, washers can be made by placing the mixture into anular shaped molds and drying it in the molds.

The amount of polyvinyl alcohol in the mixture may be varied, but in general, we prefer to use a mixture consisting of three parts by weight of the brazing powder to one part by weight of an aqueous solution containing about 32.5% polyvinyl alcohol. This mixture will thus contain about 75% by weight of brazing powder, about 8% polyvinyl alcohol, and about 17% by weight of water. If all of the water were to be evaporated from this mixture, in the process of drying the mixture, the resultant brazing composition would contain about 90% by weight of powder, and about 10% by weight of polyvinyl alcohol. However, it is necessary to retain some moisture or water in the brazing composition at all times in order to provide a self-sustaining flexible sheet of the character which has been described, and this moisture may vary from about .5% by weight of the sheet to about 5% by weight of the sheet.

The brazing composition, in the form of the dried or partially dried sheet, may be varied, so that it contains from about 5% to about 11% by weight of polyvinyl alcohol, about .5% to about 5% by weight of water, and the balance substantially all the brazing powder. This variation may be obtained in any desired manner, but is most easily obtained by varying the strength of the water solution of polyvinyl alcohol used in the mixture.

A preferred example of such a brazing composition consists of about 8% polyvinyl alcohol, about 2% water, and the balance essentially all a metallic brazing powder consisting of about 82% nickel, about 7% chromium, about 5% silicon, about 3% boron, and about 3% iron.

The mixture can be rolled out on a glass or polished steel plate, using a substance, such as silicone grease, to prevent adhesion of the mixture to the plate. The sheets, after drying, may be used directly in the brazing of parts of stainless steel and heat-resistant alloys of the type known as "super alloys."

They may, for example, be used directly in the brazing of honeycomb structures, in which case, they may be placed either on the honeycomb core or on the sheets or skins which are used to contain the core.

The assembly of the structure to be brazed and the brazing composition is held together by means of a fixture and the assembly is held in place by the polyvinyl alcohol at least until it begins to sinter, and then melts and brazes.

The use of polyvinyl alcohol is advantageous because of its complete solubility in water, the low molecular weight varieties dissolving even in cold water. This eliminates the problems incidental to dissolving a binder or vehicle in potentially dangerous organic solvents.

The polyvinyl alcohol binder holds the particles of brazing powder together until they commence to sinter and melt, and during the brazing operation, it becomes completely volatilized or consumed, leaving no ash or residue to hinder the uniform and free flow of the melted powder into the joints between the parts being brazed.

Other vinyl or polyvinyl compounds have been tried as binders, including polyvinyl acetate, polyvinyl butyraldehyde, polyvinyl butyl ether, polyvinyl methyl ether, vinyl halide polymers, and polyvinyl ketals, but have proved objectionable for one or more of the reasons hereinbefore stated.

The invention is applicable mainly to the brazing of parts of stainless steels and super alloys, but may be used for the brazing of other metals which are to be brazed or joined.

The metallic brazing powders which form the predominant constituent of the brazing compositions which are the subject of the present invention include powders of the nickel-base type, manganese-base type, copper-base type, cobalt-base type, and copper.

Among powders of the nickel-base type are those covered by A.M.S. specifications Nos. 4775, 4776, 4777 and 4778, and Coast Metals Nos. 50, 51, 53, 54, 55, 56, and 59. Coast Metals #53 is representative of such powders and has the following specification or nominal composition.

| | Percent |
|---|---|
| Nickel | 81.0–83.0 |
| Chromium | 6.5–7.5 |
| Silicon | 4.0–5.0 |
| Boron | 2.5–3.5 |
| Iron | 2.5–3.5 |
| Other elements | .5 max. |

Among powders of the manganese-base type is Coast Metals No. 62, which consists of 63–67% manganese, 14–18% nickel and 14–18% cobalt.

Among powders of the copper-base type are Coast Metals 1600–1700 Series, containing from 35 to 75% copper, about 3 to about 20% nickel, and the remainder essentially all manganese.

Among powders of the cobalt-base type are the various Stellite alloys, the compositions of which are well known.

In using said composition, the brazing composition is placed between the metallic surfaces to be brazed, and the surfaces and composition heated to a brazing temperature, which may vary from about 1700° F. to about 2150° F., whereby to effect brazing of said surfaces to each other.

This application is a continuation-in-part of our applications, Serial No. 639,239, now abandoned, and Serial No. 812,576, filed May 12, 1959, now abandoned.

Having thus described our invention, we claim:

1. A brazing composition consisting of from about 5% to about 11% by weight of polyvinyl alcohol, from about .5 to about 5% by weight of water, and the balance essentially all a metallic brazing powder selected from the group consisting of nickel-base alloys, manganese-base alloys, copper-base alloys, cobalt-base alloys, and copper.

2. The method of brazing which comprises placing between metallic surfaces to be brazed, a brazing composition consisting of from about 5% to about 11% by weight of polyvinyl alcohol, from about .5% to about 5% by weight of water, and the balance essentially all a metallic brazing powder selected from the group consisting of nickel-base alloys, manganese-base alloys, copper-base alloys, cobalt-base alloys, and copper, and heating said surfaces and composition to a brazing temperature, whereby to effect brazing of said surfaces to each other.

3. A self-sustaining sheet for use in brazing, said sheet consisting of from about 5% to about 11% by weight of polyvinyl alcohol, from about .5% to about 5% by weight of water, and the balance essentially all a metallic brazing powder selected from the group consisting of nickel-base alloys, manganese-base alloys, copper-base alloys, cobalt-base alloys, and copper.

4. The method of preparing a self-sustaining sheet for use in brazing, said method comprising the steps of preparing a mixture consisting of an aqueous solution of polyvinyl alcohol and a metallic brazing powder selected from the group consisting of nickel-base alloys, manganese-base alloys, copper-base alloys, cobalt-base alloys, and copper, forming said mixture into a sheet, and permitting water to evaporate from said sheet to the extent that the sheet will consist of from about 5% to about 11% by weight of polyvinyl alcohol, from about .5% to about 5% by weight of water, and the balance essentially said brazing powder.

References Cited in the file of this patent

UNITED STATES PATENTS

| 2,157,918 | Rankin | May 9, 1939 |
| 2,240,027 | Bacon | Apr. 29, 1941 |
| 2,385,580 | Knox | Sept. 25, 1945 |
| 2,914,435 | Wasserman | Nov. 24, 1950 |